(12) United States Patent
Manoukian

(10) Patent No.: US 10,318,304 B2
(45) Date of Patent: Jun. 11, 2019

(54) CONDITIONAL BRANCH PREDICTION USING A LONG HISTORY

(71) Applicant: MIPS Tech, LLC, Santa Clara, CA (US)

(72) Inventor: Manouk Vartan Manoukian, Hemel Hempstead (GB)

(73) Assignee: MIPS Tech, LLC, Campbell, CA (US)

( * ) Notice: Subject to any disclaimer, the term of this patent is extended or adjusted under 35 U.S.C. 154(b) by 579 days.

(21) Appl. No.: 14/809,187

(22) Filed: Jul. 25, 2015

(65) Prior Publication Data

US 2016/0026470 A1  Jan. 28, 2016

(30) Foreign Application Priority Data

Jul. 25, 2014 (GB) .................................. 1413264.1

(51) Int. Cl.
*G06F 9/30* (2018.01)
*G06F 9/38* (2018.01)
(52) U.S. Cl.
CPC .................................. *G06F 9/3848* (2013.01)
(58) Field of Classification Search
CPC .............................. G06F 9/3844; G06F 9/3848
See application file for complete search history.

(56) References Cited

U.S. PATENT DOCUMENTS

| 5,944,817 | A | * | 8/1999 | Hoyt | ...................... | G06F 9/3806 |
| | | | | | | 712/233 |
| 2004/0210749 | A1 | * | 10/2004 | Biles | ...................... | G06F 9/3848 |
| | | | | | | 712/240 |
| 2005/0223203 | A1 | | 10/2005 | Loh | | |
| 2005/0228977 | A1 | * | 10/2005 | Cypher | .................. | G06F 9/3848 |
| | | | | | | 712/240 |
| 2006/0095746 | A1 | * | 5/2006 | Uchiyama | ............. | G06F 9/3844 |
| | | | | | | 712/239 |
| 2010/0031010 | A1 | * | 2/2010 | Moyer | .................. | G06F 9/3844 |
| | | | | | | 712/238 |

(Continued)

FOREIGN PATENT DOCUMENTS

| EP | 0855646 A2 | 7/1998 |
| WO | 2010/028316 A1 | 3/2010 |
| WO | 2013/028316 A1 | 2/2013 |

OTHER PUBLICATIONS

"Table (Information)." Wikipedia, Wikimedia Foundation, Oct. 23, 2017, en.wikipedia.org/wiki/Table_(information).*

(Continued)

*Primary Examiner* — William B Partridge
(74) *Attorney, Agent, or Firm* — Adams Intellex, PLC

(57) ABSTRACT

Methods and conditional branch predictors for predicting an outcome of a conditional branch instruction in a program executed by a processor using a long conditional branch history include generating a first index from a first portion of the conditional branch history and a second index from a second portion of the conditional branch history. The first index is then used to identify an entry in a first pattern history table including first prediction information; and the second index is used to identify an entry in a second pattern history table including second prediction information. The outcome of the conditional branch is predicted based on the first and second prediction information.

18 Claims, 13 Drawing Sheets

(56) References Cited

U.S. PATENT DOCUMENTS

| | | | | |
|---|---|---|---|---|
| 2010/0169626 A1* | 7/2010 | Wang | ............... | G06F 9/3848 |
| | | | | 712/239 |
| 2011/0078425 A1* | 3/2011 | Shah | ............... | G06F 9/3806 |
| | | | | 712/239 |
| 2012/0166775 A1* | 6/2012 | Krishnamurthy | ..... | G06F 9/3848 |
| | | | | 712/239 |
| 2015/0309794 A1* | 10/2015 | Wilson | ............ | G06F 9/3806 |
| | | | | 712/240 |

OTHER PUBLICATIONS

"Array data structure." Wikipedia, Wikimedia Foundation, Oct. 19, 2017, en.wikipedia.org/wiki/Array_data_structure.*

* cited by examiner

CONDITIONAL BRANCH PREDICTION USING A LONG HISTORY

BACKGROUND

Many processors include a branch predictor that predicts which direction the program flow will take in the case of instructions known to cause possible flow changes, such as branch instructions. Branch prediction is useful as it enables instructions to be speculatively executed by the processor before the outcome of the branch instruction is known.

Branch instructions may be classified as conditional or indirect. Conditional branch instructions (branch instructions based on a constant value) require a binary decision as to whether the branch is taken or not-taken. Indirect branch instructions (branch instructions based on a variable) require an N-ary decision as to the target address where N is the number of possible target addresses.

Schemes for predicting the outcome of a conditional branch can be categorized into static and dynamic prediction schemes. Static prediction schemes typically base the prediction on a static value such as opcode or direction of the branch. Dynamic prediction schemes, on the other hand, take into account runtime behavior.

The most common dynamic branch prediction scheme is the two-level adaptive predictor scheme which makes branch predictions based on the history of branches executed during the current execution of the program. For example, a history of the last N outcomes (taken/not-taken) of previous conditional branch instructions, referred to as the taken/not-taken history, may be maintained. The history is then used to update a pattern history table (PHT) which has an entry for each possible pattern of the history. After a prediction is made the entry in the PHT corresponding to the current history pattern is updated with the prediction. Then the next time that history pattern appears the same prediction can be made.

Generally, the longer the history, the more accurate the prediction. However, as the history grows so does the PHT. In particular each bit added to the history doubles the size of the PHT. Accordingly, there is a desire to increase conditional branch prediction accuracy by using a longer history without significantly increasing the amount of information that has to be stored to make the prediction.

The embodiments described below are provided by way of example only and are not limiting of implementations which solve any or all of the disadvantages of known branch predictors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and conditional branch predictors for predicting an outcome of a conditional branch instruction using a long conditional branch history. The method comprises generating a first index from a first portion of the conditional branch history and a second index from a second portion of the conditional branch history. The first index is then used to identify an entry in a first pattern history table comprising first prediction information; and the second index is used to identify an entry in a second pattern history table comprising second prediction information. The outcome of the conditional branch is predicted based on the first and second prediction information.

A first aspect provides a method of predicting an outcome of a conditional branch instruction in a program executed by a processor, the method comprising: generating, at a first index generation module, a first index from a first portion of a conditional branch history, the conditional branch history comprising history information for each of a plurality of previously predicted conditional branch instructions, the first portion comprising a first subset of the history information in the conditional branch history; identifying an entry in a first pattern history table using the first index, the entry in the first pattern history table comprising first prediction information; generating, at a second index generation module, a second index from a second portion of the conditional branch history, the second portion comprising a second subset of the history information in the conditional branch history, the second subset being different from the first subset; identifying an entry in a second pattern history table using the second index, the entry in the second pattern history table comprising second prediction information; and predicting, using a decision logic unit, the outcome of the conditional branch instruction based on the first and second prediction information.

A second aspect provides a conditional branch predictor logic unit to predict an outcome of a conditional branch instruction in a program executed by a processor, the conditional branch predictor logic unit comprising: a first index generation module configured to generate a first index from a first portion of a conditional branch history, the conditional branch history comprising history information for each of a plurality of previously predicted conditional branch instructions, the first portion comprising a first subset of the history information in the conditional branch history; a second index generation module configured to generate a second index from a second portion of the conditional branch history, the second portion comprising a second subset of the history information in the conditional branch history, the second subset being different from the first subset; and a decision logic unit configured to: identify an entry in a first pattern history table using the first index, the entry in the first pattern history table comprising first prediction information; identify an entry in a second pattern history table using the second index, the entry in the second pattern history table comprising second prediction information; and predict the outcome of the conditional branch instruction based on the first and second prediction information.

A third aspect provides a processor comprising the conditional branch predictor logic unit of the second aspect.

A fourth aspect provides a computer readable storage medium having encoded thereon computer readable program code for generating a processor comprising the conditional branch predictor logic unit of the second aspect.

A fifth aspect provides a computer readable storage medium having encoded thereon computer readable program code for generating a processor configured to perform the method of the first aspect.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
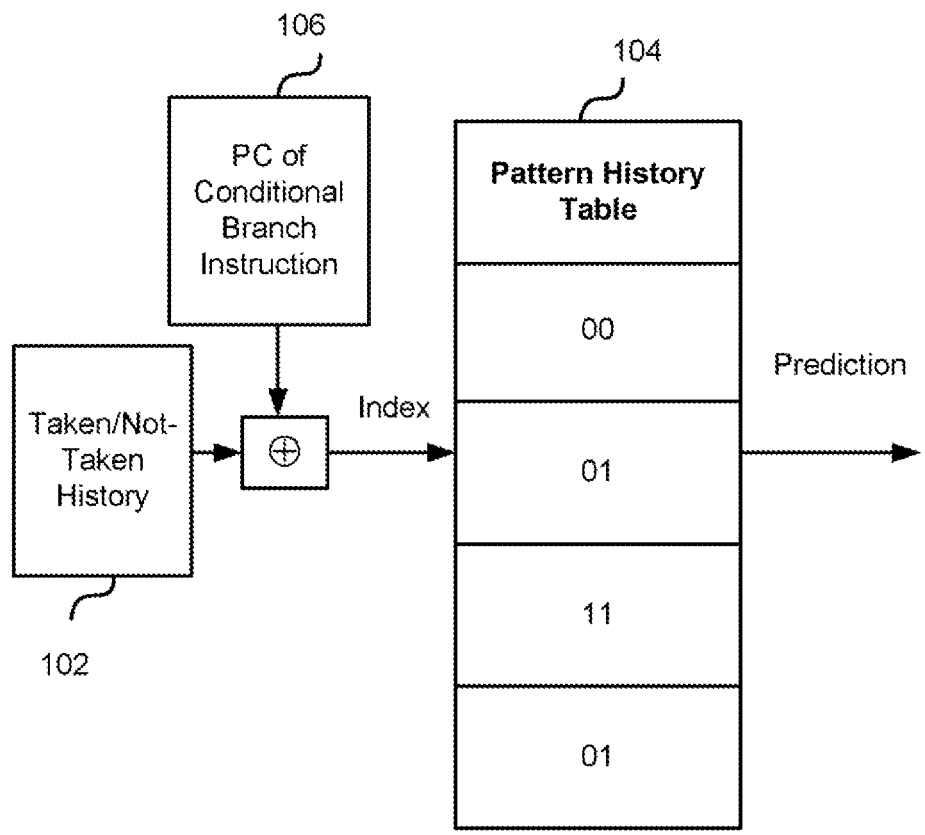
FIG. 1 is a schematic diagram of a conventional two-level adaptive predictor scheme.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above many processors include a branch predictor that predicts which direction the program flow will take in the case of instructions known to cause possible flow changes, such as branch instructions. Branch prediction is useful as it enables instructions to be speculatively executed by the processor before the outcome of the branch instruction is known.

The most common dynamic conditional branch prediction scheme is the two-level adaptive predictor scheme which makes conditional branch predictions based on the history of conditional branches executed during the current execution of the program. Such a scheme is illustrated in FIG. 1. In particular, in the two-level adaptive predictor scheme of FIG. 1 a history of the last N outcomes (taken/not-taken) of previous conditional branch instructions, referred to as the taken/not-taken history 102, is maintained. The taken/not-taken history 102 provides a path of how the program arrived at the conditional branch instruction.

The taken/not-taken history 102 is then used to generate an index for updating a pattern history table (PHT) 104. In particular after a prediction is made the prediction information for the entry corresponding to the index is updated based on the prediction. The prediction information may comprise a single bit indicating whether the branch was taken or not taken. In other cases the prediction information may comprise a saturating counter for tracking the number of times the conditional branch instruction was taken and/or not taken. The next time that index is generated the stored prediction information can be used to generate a prediction.

In some cases the index is generated by combining (e.g. by either Exclusive-ORing (XORing) or by concatenating) the taken-not taken history 102 and the address (e.g. program counter (PC)) of the conditional branch instruction 106. Where the index is generated by XORing the taken/not-taken history 102 and the program counter of the conditional branch instruction 106, the two-level adaptive predictor scheme is referred to as GShare. Where the index is generated by concatenating the taken/not taken history 102 and the address (e.g. program counter) of the conditional branch instruction 106 the two-level adaptive predictor scheme is referred to as Gselect.

Generally, the longer the history (e.g. the more information in the history), the more accurate the prediction. However as the history grows so does the PHT. In particular, each bit added to the history doubles the size of the PHT. Accordingly, there is a desire to increase conditional branch prediction accuracy by using a longer history without significantly increasing the amount of information that has to be stored to make the prediction.

Figure 2:
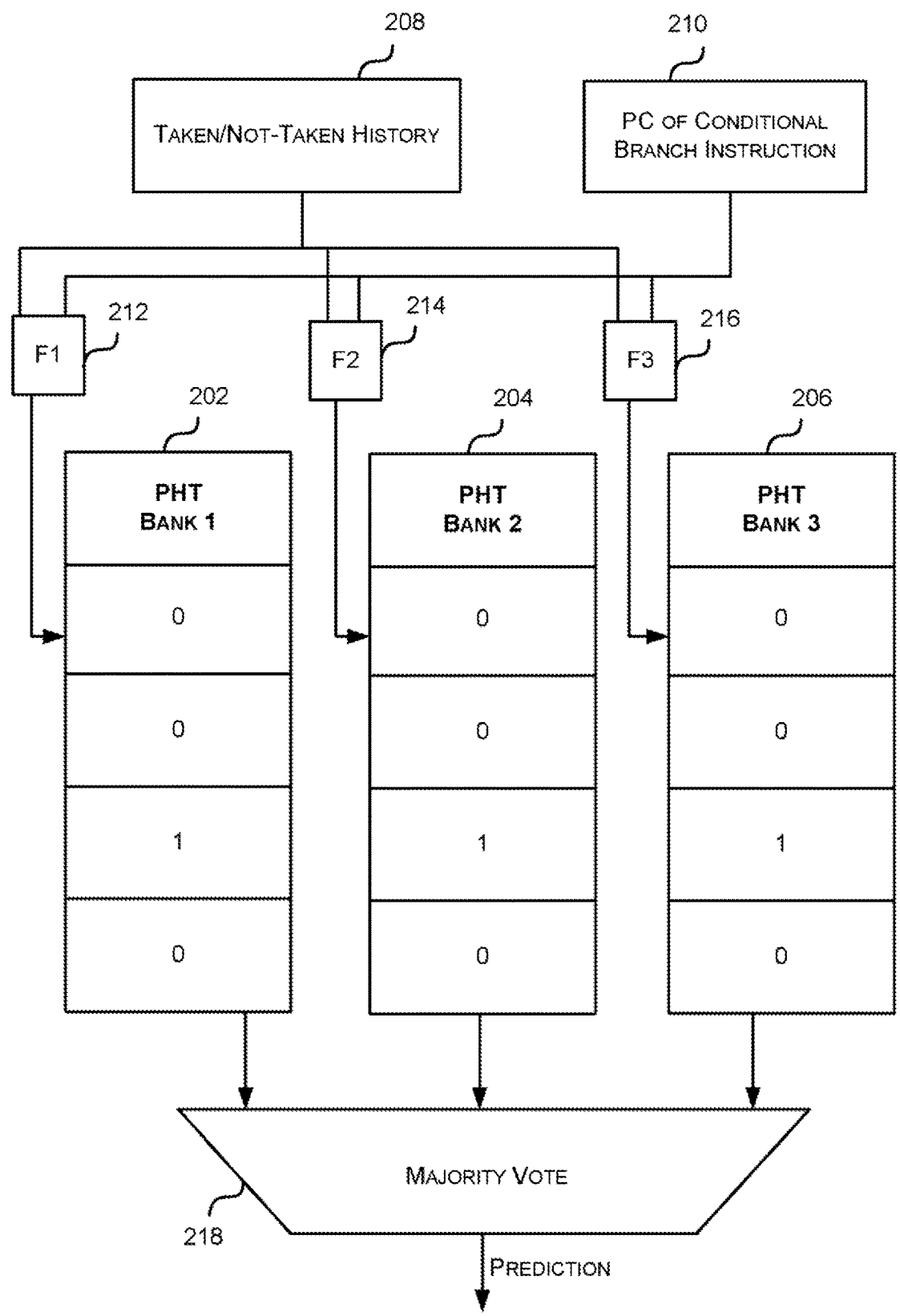
FIG. 2 is a schematic diagram of a conventional skew branch predictor scheme.

One method to address this has been to reduce the number of entries in the PHT so that more than one index maps onto each entry in the PHT. This is referred to as aliasing between two indices. Aliasing can be shown to reduce prediction accuracy where two aliased indices are based on two different sets of information. To reduce the aliasing a skewed branch predictor scheme has been developed. This is illustrated in FIG. 2. In particular, in the skewed branch predictor scheme of FIG. 2 the reduced PHT is divided into three equal PHT banks 202, 204 and 206. A general index is generated by combining the entire taken/not-taken history 208 and the address (e.g. program counter) of the conditional branch instruction 210. The general index is then hashed by three different functions (F1 212, F2 214, and F3 216) to produce one index for each PHT bank 202, 204 and 206. The prediction is then made by a majority vote 218 of the predictions from the three PHT banks 202, 204 and 206. If the prediction was wrong then all of the banks are updated, but if the prediction was right only the banks that made the correct prediction are updated.

While such a scheme requires less memory to implement it tends to take a long time to converge; thus the accuracy of initial predictions is quite low.

Figure 3:
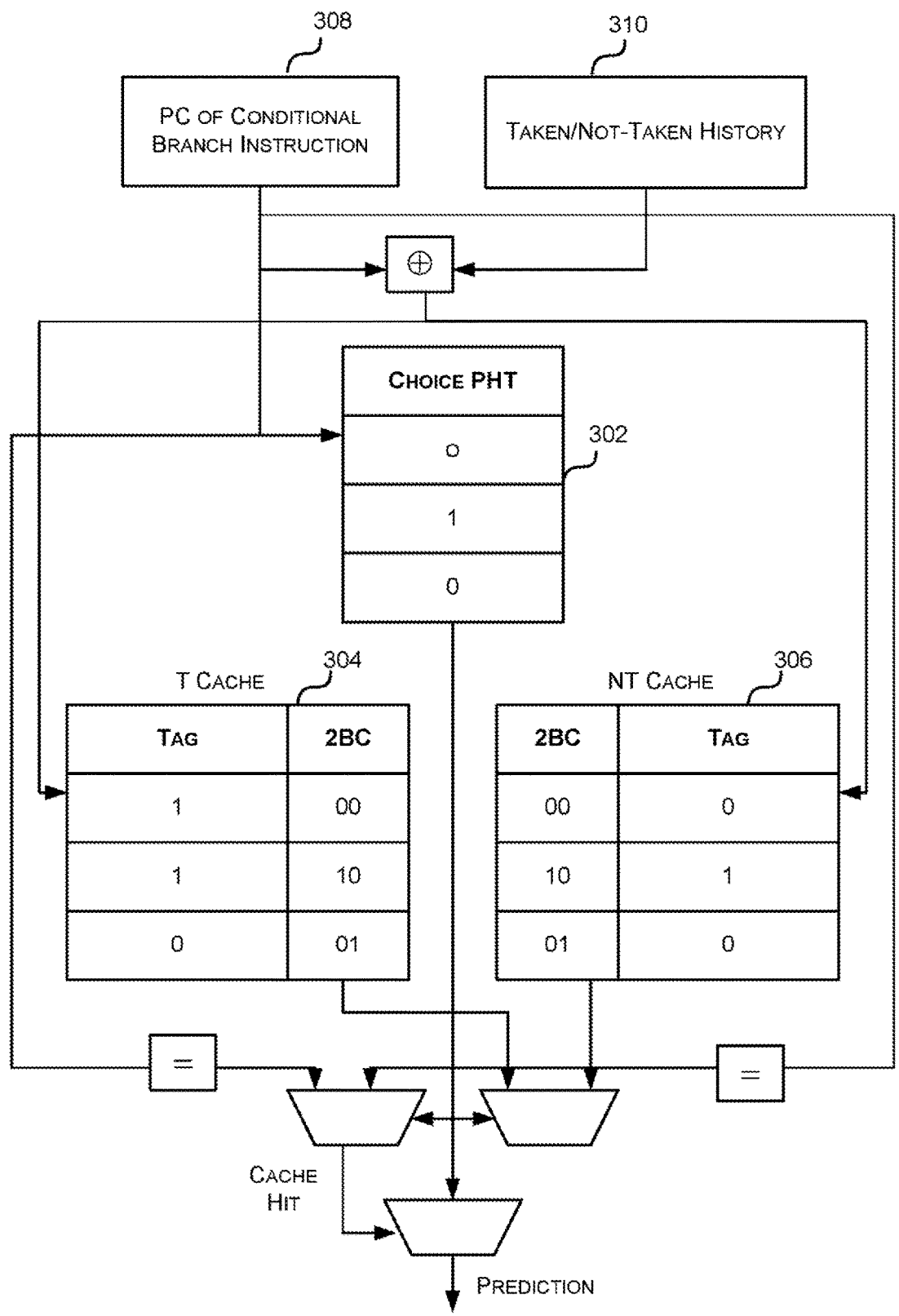
FIG. 3 is a schematic diagram of a conventional YAGS (Yet Another Global Scheme) branch prediction scheme.

Another scheme that has been developed to reduce the amount of information that has to be stored to make a prediction is referred to the YAGS (Yet Another Global Scheme) branch prediction scheme. In particular, the YAGS branch prediction scheme attempts to eliminate unnecessary information in the PHT by only storing histories that behave differently from the normal. The YAGs branch prediction scheme is illustrated in FIG. 3. This scheme comprises a choice PHT 302, a taken cache 304 and a not-taken cache 306. The choice PHT 302 is a bi-modal predictor (e.g. an array of two bit saturating counters) that points to taken or not-taken. The taken and not-taken caches 304 and 306 then only store instances when the branch does not comply with its bias.

When a conditional branch instruction occurs the address (e.g. program counter) of the conditional branch instruction 308 is used to access the choice PHT 302. If the choice PHT indicates the branch is taken the index generated by the combination of the taken-not-taken history 310 and the address (e.g. program counter) of the conditional branch instruction 308 is used to access the not-taken cache 306 to see if it is a special case, where the prediction does not agree with the bias. If there is a miss in the not-taken cache 306 then the choice PHT 302 is used as the prediction. Otherwise the not-taken cache 306 is used as the prediction. A similar set of events occur when the choice PHT indicates not-taken, but in this case the taken cache 304 is accessed to see if it is a special case where the prediction does not agree with the bias.

A cache 304 or 306 is updated if a prediction from it was used or if the choice PHT and branch outcome do not agree.

However, the taken and not-taken caches 304 and 306 of the YAGS branch prediction scheme are fully associative structures meaning all elements need to be read on every access. This is only possible for small caches. If a larger predictor is needed the fully associative caches causes timing, power and area problems.

Described herein are methods and branch predictors for predicting the outcome (taken/not-taken) of a conditional branch instruction from a conditional branch history by using different portions of the conditional branch history to identify predictions in a plurality of pattern history tables. In particular a first portion of the conditional branch history is used to identify a first prediction in a primary pattern history table and a second portion of the conditional branch history is used to identify a second prediction in a secondary pattern history table. The outcome then is based on the first and second predictions.

The methods and branch predictors described herein allow a longer history to be used without increasing the amount of information stored to make the prediction. In particular, by using two or more smaller pattern history tables instead of one larger pattern history table less information is stored. For longer histories this allows a more accurate prediction to be made with less stored information. Also, by not using the cache structures of the YAGS branch prediction scheme the timing, power and area problems associated therewith are avoided.

Figure 4:
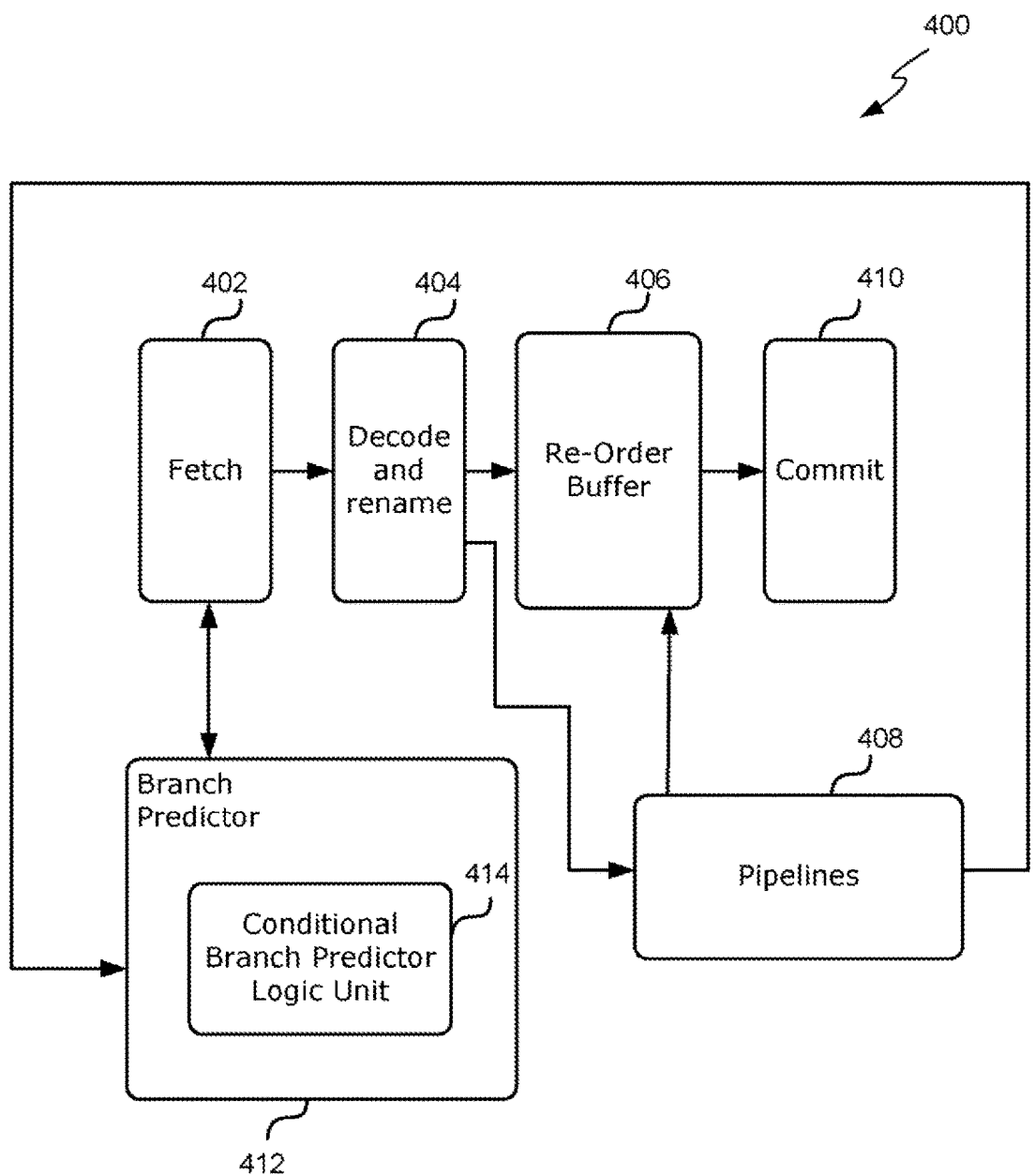
FIG. 4 is a block diagram of an example single-threaded processor.

Reference is now made to FIG. 4 which illustrates a single-threaded processor 400 where the outcome of a conditional branch instruction is predicted by using different portions of the conditional branch history to identify predictions in a plurality of pattern history tables. The processor 400 comprises a fetch stage 402 configured to fetch instructions from a program (in program order) as indicated by a program counter (PC) and a decode and renaming stage 404 arranged to interpret the instructions and perform register renaming.

After an instruction passes through the decode and renaming stage 404, it is (a) inserted into a re-order buffer (ROB) 406 and (b) dispatched to pipelines 408 for execution.

The re-order buffer 406 is a buffer that enables the instructions to be executed out-of-order, but committed in-order. The re-order buffer 406 holds the instructions that are inserted into it in program order, but the instructions within the ROB 406 can be executed out of sequence by the plurality of pipelines 408. In some examples, the re-order buffer 406 can be formed as a circular buffer having a head pointing to the oldest instruction in the ROB 406, and a tail pointing to the youngest instruction in the ROB 406. Instructions are output from the re-order buffer 406 in program order. In other words, an instruction is output from the head of the ROB 406 when that instruction has been executed by the pipelines 408, and the head is incremented to the next instruction in the ROB 406. Instructions output from the re-order buffer 406 are provided to a commit stage 410, which commits the results of the instructions to the register/memory.

The processor 400 also comprises a branch predictor 412, which is configured to predict which direction the program flow will take in the case of instructions known to cause possible flow changes, such as branch instructions. Branch prediction is useful as it enables instructions to be speculatively executed by the processor 400 before the outcome of the branch instruction is known. The branch predictor 412 may be in communication with the fetch stage 402 and/or the pipelines 408. For example, the fetch stage 402 may provide information to the branch predictor 412 indicating which instructions are branch instructions and may use information from the branch predictor 412 to determine which instruction to fetch next; and the pipelines 408 may provide the branch predictor 412 with information indicating updates to the program counter.

When the branch predictor 412 predicts the program flow accurately, this improves performance of the processor 400. However, if the branch predictor 412 does not correctly predict the branch direction, then a mis-prediction occurs which needs to be corrected before the program can continue. To correct a mis-prediction, the speculative instructions sent to the ROB 406 are abandoned, and the fetch stage 402 starts fetching instructions from the correct program branch.

The branch predictor 412 comprises an indirect branch predictor logic unit (not shown) for predicting indirect branches (branch instructions based on a variable) and a conditional branch predictor logic unit 414 for predicting conditional branches (branch instructions based on a constant).

The conditional branch predictor logic unit 414 predicts the outcome (taken/not-taken) of a conditional branch instruction by using different portions of the conditional branch history to identify predictions in a plurality of pattern history tables.

Figure 5:
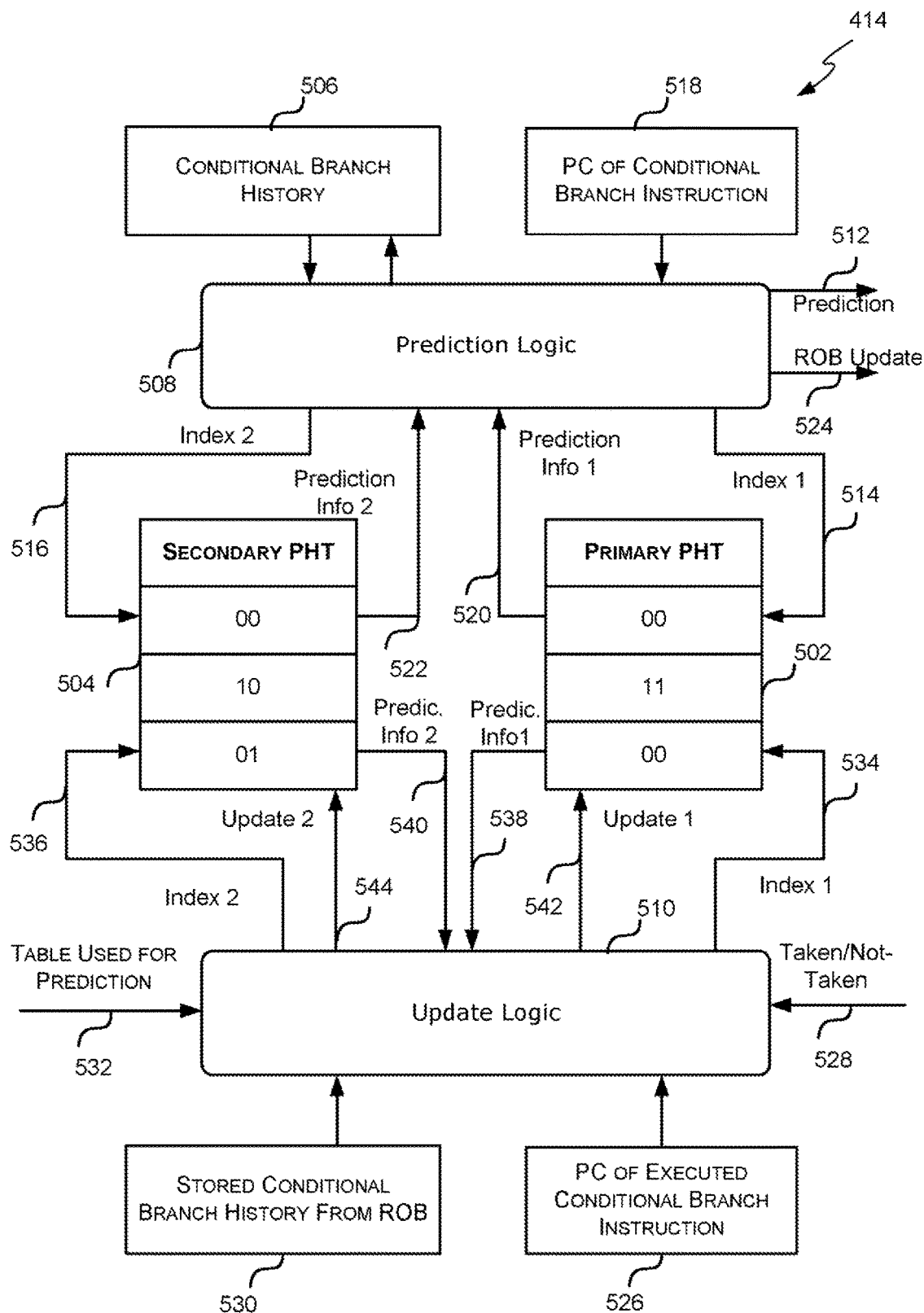
FIG. 5 is a block diagram of an example conditional branch predictor logic unit of FIG. 4.

Reference is now made to FIG. 5 which illustrates an example conditional branch predictor logic unit 414. The example conditional branch predictor logic unit 414 of FIG. 5 comprises a plurality of pattern history tables (PHT) 502 and 504 configured to store prediction information for conditional branch instructions where each table 502 and 504 is indexed by a different portion of the conditional branch history 506; a prediction logic unit 508 configured to predict the outcome (taken/not-taken) of a conditional branch instruction based on the prediction information in the pattern history tables 502 and 504; and an update logic unit 510 configured to update the prediction information in the pattern history tables 502 and 504 after a conditional branch instruction has been executed and the actual outcome is known.

The conditional branch history 506 is a record of previous conditional branch instructions. In particular the conditional branch history 506 comprises history information for each of a predetermined number of previous conditional branch instructions. The history information may comprise, for example, the outcome of the conditional branch instruction and/or the target address or part thereof of the conditional branch instruction. The number of conditional branches represented in the conditional branch history 506 is referred to as the path length. For example, if the path length of the conditional branch history 506 is ten, then the conditional branch history 506 comprises history information for the ten previous conditional branch instructions. In some cases the conditional branch history is implemented as a shift register. Example conditional branch histories are described with reference to FIG. 7.

In the examples described herein the conditional branch history 506 is global, meaning that there is only one conditional branch history 506 for all conditional branch instructions. In particular the history information for all conditional branch instructions is stored in the same conditional branch history. However, in other examples, the conditional branch history 506 may be specific to a particular conditional branch instruction or to a set of conditional branch instructions. In these examples, there may be a conditional branch history table comprising several conditional branch histories, one for each particular conditional branch instruction or one for each set of conditional branch instructions. In cases where there is one conditional branch history for each particular conditional branch instruction or one for each set of conditional branch instructions, the address (or part thereof) of the conditional branch instruction may be used to select which conditional branch history is used to generate the indices.

The PHTs 502 and 504, like the PHTs of FIGS. 1-3, are tables which are configured to store prediction information for conditional branch instructions. In particular each entry or row of the PHT stores prediction information. The prediction information may, for example, comprise a single bit indicating the prediction (taken/not-taken). In other cases the prediction information may comprise a saturating counter which indicates the prediction (taken/not-taken) and the quality of the prediction (e.g. strong or weak). An example, saturating counter is described with reference to FIG. 9.

However, in contrast to the PHTs of FIGS. 1 to 3, each PHT 502 and 504 is indexed by a separate portion of the conditional branch history. This allows the PHTs 502 and 504 to be smaller than if they were both indexed by the entire conditional branch history. For example if the conditional branch history comprises ten bits then a PHT indexed by the entire conditional branch history will have $2^{10}$=1024 entries. In contrast, if six bits of the conditional branch history are used to index a first PHT (e.g. primary PHT 502) and four bits of the conditional branch history are used to index a second PHT (e.g. secondary PHT 504), the first PHT will have $2^6$=64 entries and the second PHT will have $2^4$=16 entries. Therefore between the two PHTs there will be a total of 80 entries. Accordingly, indexing a plurality of tables using different portions of the conditional branch history 506 significantly reduces the amount of data that is stored compared to indexing a single table using the entire conditional branch history.

The prediction logic unit 508 is configured to generate a prediction 512 for a conditional branch instruction based on the information in the PHTs 502 and 504. In particular, the prediction logic unit 508 obtains the conditional branch history 506 and generates an index 514 and 516 for each of the PHTs. In particular, the prediction logic unit 508 uses a first portion of the conditional branch history 506 to generate a first index 514 for the first or primary PHT 502 and a second portion (distinct from the first portion) of the conditional branch history 506 to generate a second index 516 for the second or secondary PHT 504.

As described below in more detail, in some cases the conditional branch history 506 is divided into two portions and the portion comprising the least significant bits is used to generate the index 514 for the primary PHT 502 and the portion comprising the most significant bits is used to generate the index 516 for the secondary PHT 504.

In some cases one or more of the indices is generated by combining the relevant portion of the conditional branch history with the program counter (PC) of the conditional branch instruction being predicted 518.

Each generated index 514 and 516 is then used to identify a particular entry in the corresponding PHT 502 or 504. The prediction information 520 and 522 in each entry identified by an index 514 or 516 is then used by the prediction logic unit 508 to make a prediction 512 on the outcome (taken/not-taken) for the conditional branch instruction. As described above, each piece of prediction information 520 and 522 comprises a prediction. In some cases, as described in more detail below, the prediction logic unit 508 is configured to select one of the predictions in the prediction information as the prediction for the conditional branch instruction using one or more criteria. The prediction 512 may be supplied to the fetch stage 402 so that it knows which instruction to fetch next.

The prediction logic unit 508 may also be configured to update the conditional branch history 506 to include the predicted outcome. For example, the conditional branch history may be updated so that the most recent outcome in the path is the predicted outcome. The prediction logic unit 508 may also be configured to send an update to the ROB 524 so that the ROB will comprise a record of the conditional branch history, the predicted outcome, and the table the prediction was based on. The conditional branch history stored in the ROB reflects the conditional branch history at the time the outcome of the conditional branch instruction was predicted and may be referred to herein as a snapshot of the conditional branch history. This information, as described below, can be used to update the PHTs after a conditional branch instruction has been executed and the actual outcome is known.

An example prediction logic unit 508 will be described in more detail with reference to FIG. 6.

The update logic unit 510 is configured to receive information on an executed conditional branch instruction and update the PHT tables 502 and 504 accordingly. For example, in some cases the update logic unit 510 is configured to receive the program counter (PC) of an executed conditional branch instruction 526 and information indicating whether the branch was taken or not taken 528. The update logic unit 510 may then use the program counter 526 to obtain the stored conditional branch history 530, the information indicating the PHT used for prediction 532 from the ROB, and the predicted outcome. As described above the stored conditional branch history 530 reflects the conditional branch history at the time the outcome of the conditional branch instruction was predicted.

The update logic unit 510 then uses the stored conditional branch history 530 to generate an index 534 and 536 for each of the PHTs in a similar manner to that used by the prediction logic unit 508 to generate the indices 514 and 516 used for prediction. In particular, the update logic unit 510 uses a portion of the stored conditional branch history 530 to generate a first index 534 for the first or primary PHT 502 and a second portion (distinct from the first portion) of the stored conditional branch history 530 to generate a second index 536 for the second or secondary PHT 504.

Each generated index 534 and 536 is then used to identify a particular entry in the corresponding PHT 502 or 504. The prediction information 538 and 540 in one or more of the entries identified by an index 534 or 536 is used in conjunction with the actual outcome information 528 and the table used for prediction 532 to generate an update 542 and 544 for one or more of the tables. As described above, each piece of prediction information 538 and 540 may comprise a saturating counter. In these cases generating an update may comprise generating a new saturating counter value based on the actual outcome.

Once an update 542 or 544 has been generated it is written to the corresponding PHT using the index 534 or 536 generated for that PHT 502 or 504.

An example update logic unit 510 will be described in more detail below with reference to FIG. 11.

Figure 6:
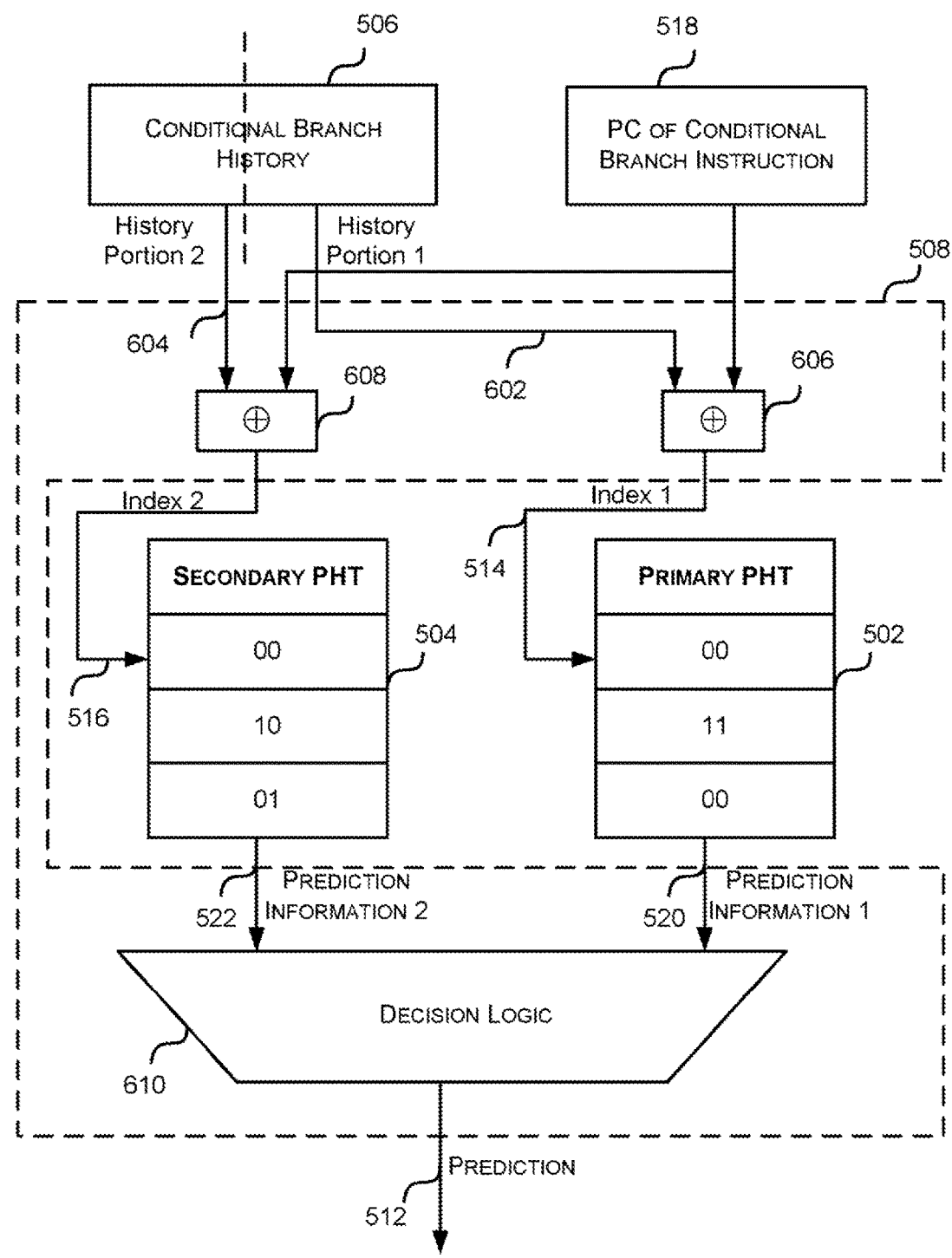
FIG. 6 is a block diagram of an example prediction logic unit of FIG. 5.

Reference is now made to FIG. 6 which illustrates an example prediction logic unit 508. The prediction logic unit 508 is configured to generate a prediction 512 for a conditional branch instruction based on prediction information in two PHTs 502 and 504 wherein each of the PHTs 502 and 504 is indexed based on a different portion of the conditional branch history.

In the example of FIG. 6, the conditional branch history 506 is divided into two contiguous portions 602 and 604. Each portion comprises a subset of the history information of the conditional branch history 506. A subset of a group of components is used herein to mean some, but not all of components of the group. In particular, a subset of the history information of the conditional branch history comprises some of the history information of the conditional branch history, but not all of the history information of the conditional branch history.

The first portion 602 is used to generate the index 514 for the first PHT 502 and the second portion 604 is used to generate the index 516 for the second PHT 504. In some cases the first portion is the portion with the least significant bits of the history and the second portion is the portion with the most significant bits of the history. The two portions may have the same number of bits or a different number of bits. Testing has shown that the accuracy of the prediction may be enhanced in some cases when the first portion 602 is larger than the second portion 604 (e.g. contains more history information (e.g. history information for more conditional branches) or more bits). However, the actual division of bits of the conditional branch history between the two portions 602 and 604 may be selected based on the application in which the branch predictor will be running. In some cases the division of bits between the two portions may be selected based on testing.

The first and second portions 602 and 604 may be stored together or separately. Where, however, the first and second portions 602 and 604 are stored separately, for purposes of updating the conditional branch history they are treated as being one history. For example, as described with reference to FIG. 7, when a new conditional branch instruction has been predicted the conditional branch history may be updated by shifting all of the bits of the conditional branch history to the next highest bit in the history and adding the predicted outcome for the new conditional branch instruction to the last or least significant but in the history. For purposes of shifting, the two portions are treated as being one. In particular, where the first portion encompasses the least significant bits, after a new conditional branch instruction has been predicted, the most significant bit of the first portion is shifted to the least significant bit of the second portion.

The prediction logic unit 508 comprises a first index generation module 606 for generating the index 514 for the first PHT 502 from the first portion 602 of the conditional branch history 506; a second index generation module 608 for generating the index 516 for the second PHT 502 from the second portion of the conditional branch history 506; and a decision logic unit 610 for predicting the outcome 512 for the conditional branch instruction based on the prediction information in the PHTs 502 and 504 corresponding to the indices 514 and 516 generated by the first and second index generation modules 606 and 608.

The first index generation module 606 is configured to generate a first index 514 for the first PHT 502 from the first portion 602 of the conditional branch history 506. In some cases the first index generation module 606 is configured to generate the first index 514 by combining the first portion 602 of the conditional branch history 506 and the program counter for the conditional branch instruction to be predicted 518 or a portion thereof. The combination may be achieved using a hashing function, such as, but not limited to, an XOR function. However, other suitable combinations and/or hashing functions may be used. An example method for generating the index will be described with reference to FIG. 8.

The second index generation module 608 is configured to generate a second index 516 for the second PHT 504 from the second portion 604 of the conditional branch history 506. In some cases the second index generation module 608 is configured to generate the second index 516 by combining the second portion 604 of the conditional branch history 506 and the program counter for the conditional branch instruction to be predicted 518 or a portion thereof. The combination may by achieved using a hashing function, such as, but not limited to, an XOR function. However, other suitable combinations and/or hashing functions may be used.

The decision logic module 610 is configured to receive the prediction information 520 and 522 from the first and second PHTs 502 and 504 corresponding to the first and second indices 514 and 516 generated by the first and second index generation modules 606 and 608 and to predict the outcome 512 of the conditional branch instruction based on the received prediction information 520 and 522.

As described above, the prediction information 520 and 522 typically comprises a prediction (taken/not taken) and it may also comprise information indicating the strength of the prediction (e.g. where the prediction information is a saturating counter). Generally the decision logic module 610 implements a mechanism for selecting between the two predictions if they differ. In some cases the decision logic module 610 may be configured to select the prediction from the prediction information received from the first or primary PHT as the output prediction 512 if the prediction is a strong prediction and otherwise to the select the prediction from the prediction information received from the second or secondary PHT. In other cases, the decision logic module 610 may be configured to select the prediction with the higher quality prediction. However, other suitable methods for selecting between the predictions received from the two PHTs may be used.

Figure 7:
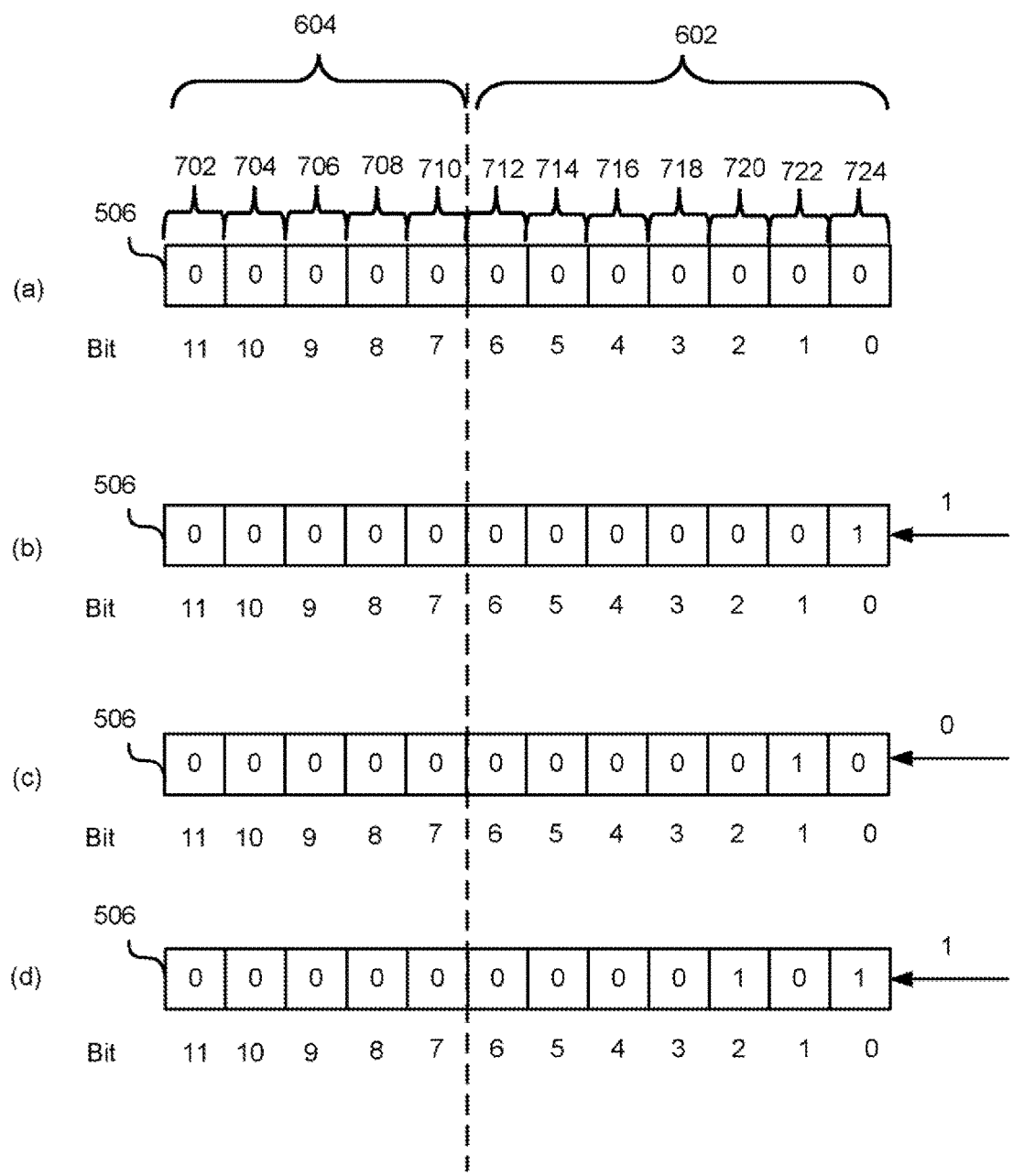
FIG. 7 is a schematic diagram of example conditional branch histories.

Reference is now made to FIG. 7 which illustrates example conditional branch histories 506. In this example the conditional branch history 506 comprises a record of the predicted outcome (taken/not-taken) of the M most recently predicted conditional branch instructions where M is the path length. For example, if M is five, then the conditional branch history 506 records the predicted outcome of the five most recently predicted conditional branch instructions.

The example conditional branch history 506 of FIG. 7 is twelve bits long and has a path length, M, of twelve. Accordingly, the conditional branch history 506 uses one bit to record the outcome (taken/not-taken) of each of the twelve most recently predicted conditional branch instructions. In some cases a one ("1") is used to indicate that the branch was taken and a zero ("0") is used to indicate that the branch was not taken. It will be evident to a person of skill in the art that the conditional branch history may comprise more or fewer bits, may have a higher or lower path length (M), and may have additional information (e.g. target address of part thereof) for each predicted conditional branch instruction.

In this example, the conditional branch history 506 can be divided into twelve blocks 702-724 where each block is a single bit that represents the outcome of a recently predicted conditional branch. The blocks are in order of prediction of the corresponding conditional branch wherein the left-most block (block 702) represents the outcome of the oldest predicted conditional branch instruction in the history 506 and the right-most block (block 724) represents the outcome of the youngest (or most recently) predicted conditional branch instruction in the history 506.

In this example, the seven least significant bits (block 712-724) form the first portion 602 of the conditional branch history and the five most significant bits (blocks 702-710) form the second portion 604 of the conditional branch history. However, it will be evident to a person of skill in the art that the two portions 602 and 604 may comprise more, fewer or different bits of the conditional branch history 506.

In some cases, the conditional branch history 506 is initially set to all zeros as shown at (a) of FIG. 7 and when the conditional branch predictor logic unit 414 predicts the outcome of a conditional branch instruction, the conditional branch predictor logic unit 414 shifts the data in blocks 704-724 one bit to the left to blocks 702-722 respectively and the predicted outcome for the new conditional branch instruction is inserted into the last significant bit (block 724).

For example, if the conditional branch predictor logic unit 414 predicts that a conditional branch will be taken (e.g. the predicted outcome is "1") then the conditional branch predictor logic unit 414 may shift the data "000000000000" in blocks 704-724 to blocks 702-722 respectively and insert the predicted outcome ("1") into block 724 so that the conditional branch history 506 contains the data "000000000001" as shown at (b) of FIG. 7.

If the conditional branch predictor logic unit 414 then subsequently predicts that the next conditional branch will not be taken (e.g. the predicted outcome is "0") then the conditional branch predictor logic unit 414 may shift the data "000000000001" in blocks 704-724 to blocks 702-722 respectively and insert the predicted outcome ("0") into block 724 so that the conditional branch history 506 contains the data "000000000010" as shown at (c) of FIG. 7.

Similarly, if the conditional branch predictor logic unit 414 then subsequently predicts that the next conditional branch will be taken (e.g. the predicted outcome is "1") then the conditional branch predictor logic unit 414 may shift the data "000000000010" in blocks 704-724 to blocks 702-722 respectively and insert the predicted outcome ("1") into block 724 so that the conditional branch history 506 contains the data "000000000101" as shown at (d) of FIG. 7.

It can be seen from the examples in FIG. 7 that the two portions 602 and 604 of the conditional branch history 506 are treated as being a single history for purposes of updating the conditional branch history 506. In particular bits are shifted from one portion 602 to the other portion 604 as if they are one history.

Figure 8:
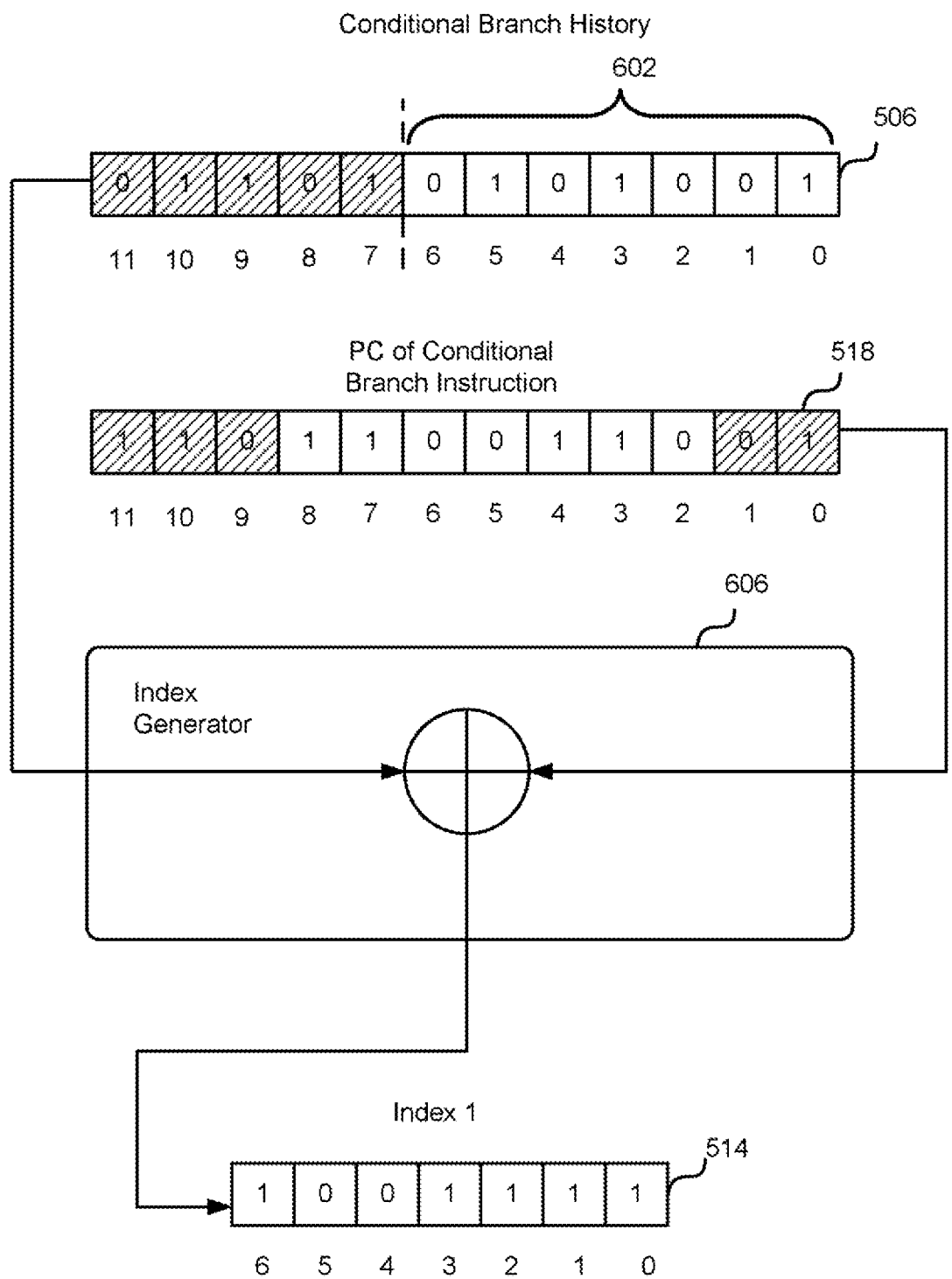
FIG. 8 is a schematic diagram of an example index generation module of FIG. 6.

Reference is now made to FIG. 8 which illustrates an example first index generation module 606 of FIG. 6. As described above with reference to FIG. 6, the first index generation module 606 receives information from the fetch stage 402 identifying a conditional branch instruction in the program. In some cases the information identifying the conditional branch instruction is the address (e.g. program counter) of the conditional branch instruction. The first index generation module 606 then obtains the first portion 602 of the conditional branch history 506 and generates an index for the first PHT 502 from the first portion 602. In some cases the first index generation module 606 is configured to generate the first index by combining the first portion 602 of the conditional branch history 506 and the PC of the conditional branch instruction to be predicted 518.

In the example shown in FIG. 8 the first index generation module 606 performs a bit-wise exclusive-or (XOR) operation on the first portion 602 of the conditional branch history 506 and a portion of the PC of the conditional branch instruction 518 to generate the first index 514. For example, in FIG. 8 the first index generation module 606 uses bits 2 to 8 of the PC of the conditional branch instruction. Generally the index generation module 606 is configured to select bits of the PC of the conditional branch instruction in the middle of the PC since the most significant bits and the least significant bits have proved to provide less relevant information.

As is known to those in the art bit-wise XOR produces a "0" if the two corresponding bits are the same and produces a "1" if the two corresponding bits are different. For example, as shown in FIG. 8, where the first portion of the conditional branch history is "0101001" and bits 2 to 8 of the PC of the conditional branch instruction are "1100110" the resulting index 514 is "1001111".

Figure 9:
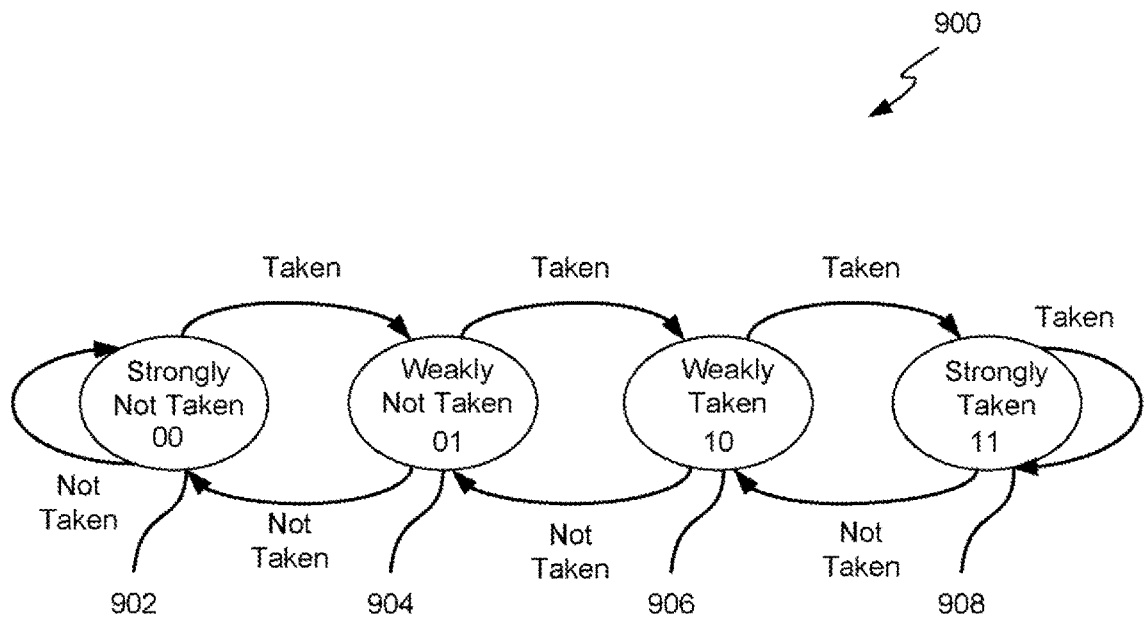
FIG. 9 is a schematic diagram of an example saturating counter.

Reference is now made to FIG. 9 which illustrates an example saturating counter 900 which may be used in the PHTs 502 and 504 described herein. A saturating counter is a state machine with a plurality of states, wherein the number of states is based on the number of bits in the counter. In particular, the state machine typically has $2^X$ states where X is the number of bits in the counter. The first bit of the counter indicates the prediction—e.g. whether the branch is to be taken or not. In some cases a one indicates a branch is taken and a zero indicates the branch is not taken. The remaining bits of the counter indicate the strength of the prediction. The state machine is updated after the branch is taken or not taken. In some cases the saturating counter is incremented when the branch is taken and is decremented when the branch is not taken.

In the example, shown in FIG. 9 the counter has two bits thus the state machine has $s^2=4$ possible states "00" 902, "01" 904, "10" 906 and "11" 908. The first two states "00" 902 and "01" 904 predict that the branch is not taken; and the second two states "10" 906 and "11" 908" predict that the branch is taken. The first and fourth states "00" 902 and "11" 908 are strongly predicted whereas the second and third states "01" 904 and "10" 906 are weakly predicted.

While FIG. 9 illustrates a two-bit saturating counter it will be evident to a person of skill in the art that a saturating counter may be implemented with more than two bits.

Figure 10:
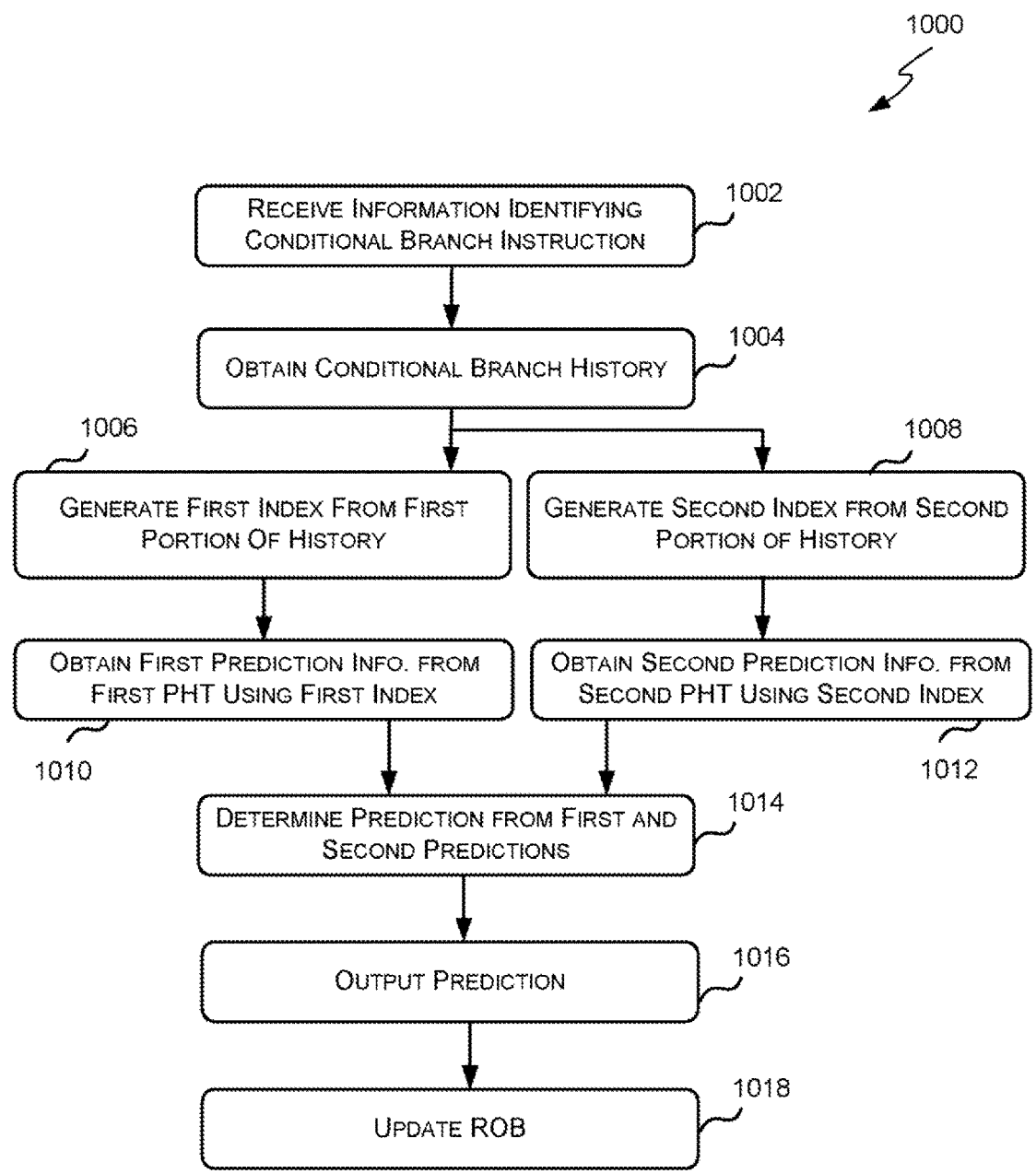
FIG. 10 is a flowchart of an example method for predicting the outcome of a conditional branch instruction using the conditional branch predictor logic unit of FIG. 5.

Reference is now made to FIG. 10 which illustrates an example method 1000 for predicting the outcome of a conditional branch instruction which may be executed by the conditional branch predictor logic unit 414 of FIGS. 4 and 5. At block 1002 the conditional branch predictor logic unit 414 receives information from the fetch stage 402 identifying a conditional branch instruction to be predicted. The information identifying the conditional branch instruction may be the address (e.g. program counter) of the conditional branch instruction. Once the information identifying the conditional branch instruction has been received, the method 1000 proceeds to block 1004.

At block 1004, the conditional branch predictor logic unit 414 obtains the conditional branch history. Once the conditional branch history has been obtained the method 1000 proceeds to blocks 1006 and 1008.

At block 1006, a first index is generated from a predetermined first portion of the conditional branch history. In some cases the first index is generated by combining the first portion of the conditional branch history with the address (e.g. program counter) of the conditional branch instruction or a portion thereof. Similarly, at block 1008 a second index is generated from a predetermined second portion of the conditional branch history. The second portion is distinct from the first portion (e.g. the first and second portions do not comprise the same subset of history information). As described above the second portion may comprise the portion with the most significant bits. In some cases the second index is generated by combining the second portion of the conditional branch history with the address (e.g. program counter) of the conditional branch instruction or a portion thereof. Once the indices have been generated the method proceeds to block 1010 and 1012 respectively.

At blocks 1010 and 1012 the indices generated in blocks 1006 and 1008 are used to obtain prediction information from the first and second PHTs respectively. The prediction information obtained from the first PHT using the first index will be referred to as the first prediction information and the prediction information obtained from the second or secondary PHT using the second index will be referred to as the second prediction information. Once the first and second prediction information has been obtained the method proceeds to block 1014.

At block 1014, the outcome of the conditional branch instruction is predicted based on the first and second prediction information. As described above prediction information comprises a prediction and may also comprise information indicating the strength of the prediction. Where the prediction information comprises information indicating the strength of the prediction the relative strength of the predictions may be used to decide which prediction is selected as the predicted outcome. In some cases the prediction of the first prediction information is favored over the prediction of the second prediction information. For example, the prediction of the first prediction information may be selected as the prediction if it is a strong prediction, and otherwise the prediction of the second prediction information may be selected as the prediction. Once a prediction has been made the method 1000 proceeds to block 1016 where the prediction is output. Once the prediction has been output the method 1000 proceeds to block 1018.

At block 1018, the re-order buffer (ROB) is updated (using the information identifying the conditional branch instruction) to store a copy of the conditional branch history, the predicted outcome, and the PHT used to make the prediction. This information can be used later to update the PHTs after the conditional branch instruction has been executed and the outcome is known. Once the ROB has been updated, the method 1000 ends.

Figure 11:
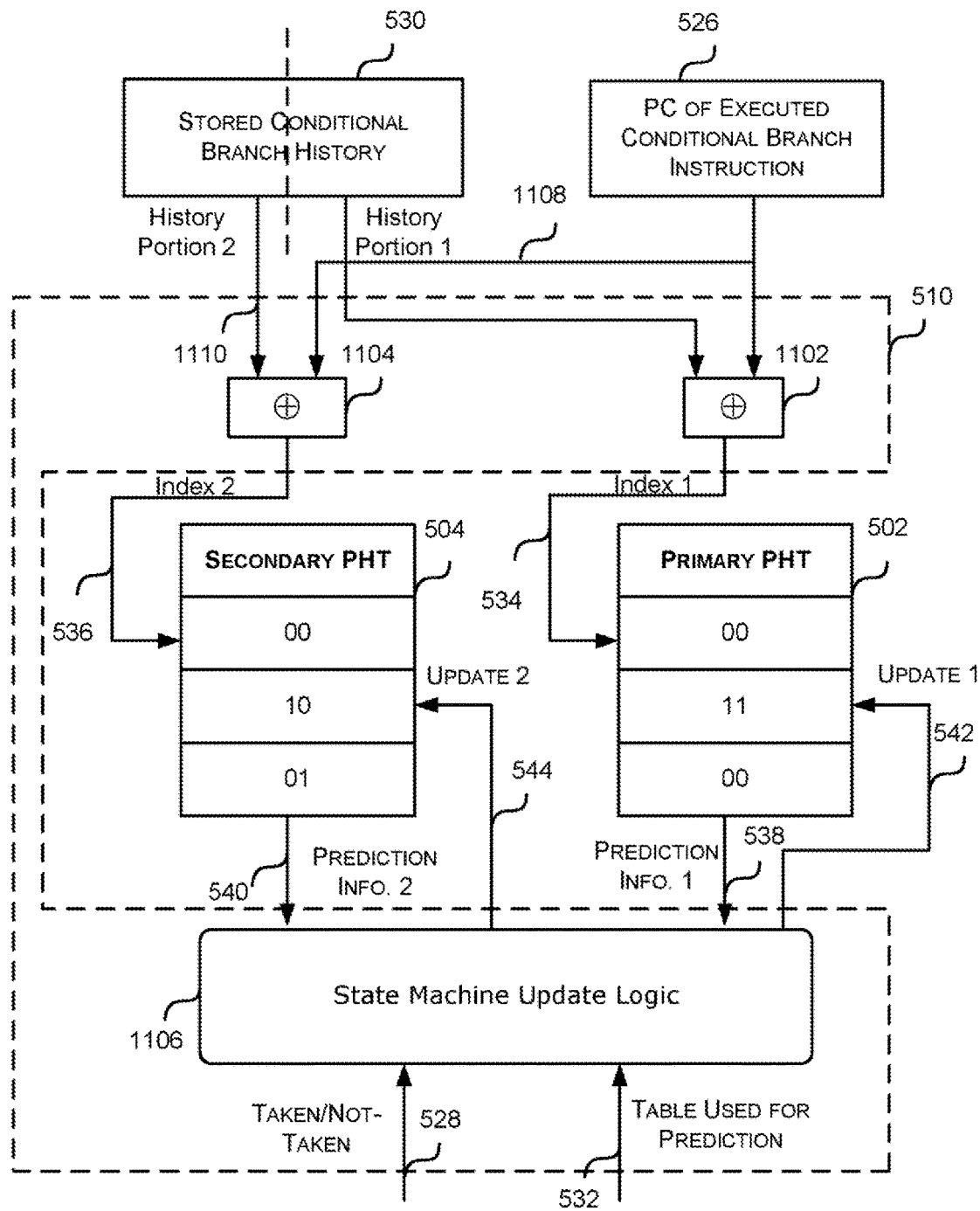
FIG. 11 is a block diagram of an example update logic unit of FIG. 5.

Reference is now made to FIG. 11 which illustrates an example update logic unit 510. The update logic unit 510 is configured to update the prediction information in the PHTs 502 and 504 after a conditional branch instruction has been executed and thus the outcome is known. In particular the update logic unit 510 uses the conditional branch history 530 stored in the ROB for the conditional branch instruction to update the PHTs. The stored conditional branch history 530 represents the conditional branch history at the time the outcome of the conditional branch instruction was predicted. The stored conditional branch history 530 is divided into a first portion 1108 and a second portion 1110 in the same manner as the conditional branch history 506 maintained by the prediction logic unit 508.

The update logic unit 510 comprises a first index generation module 1102 for generating an index 534 for the first PHT 502 from the first portion 1108 of the stored conditional branch history 530 (e.g. the conditional branch history used to predict the outcome of the conditional branch instruction); a second index generation module 1104 for generating an index 536 for the second PHT 504 from the second portion 1110 of the stored conditional branch history 530; and a state machine update logic unit 1106 for updating the PHTs 502 and 504 based on the actual outcome of the conditional branch instruction.

The first index generation module 1102 is configured to generate a first index 534 for the first PHT 502 from the first portion 1008 of the stored conditional branch history 530. In some cases the first index generation module 1102 is configured to generate the first index 534 by combining the first portion 534 and the program counter for the executed conditional branch instruction 526 or a portion thereof. The combination may be achieved using a hashing function, such as, but not limited to, an XOR function. However, other suitable combinations and/or hashing functions may be used.

The second index generation module 1104 is configured to generate a second index 536 for the second PHT 504 from the second portion 1110 of the stored conditional branch history 530. In some cases the second index generation module 1104 is configured to generate the second index 536 by combining the second portion 1110 and the program counter for the executed conditional branch instruction or a portion thereof. The combination may by achieved using a hashing function, such as, but not limited to, an XOR function. However, other suitable combinations and/or hashing functions may be used.

The state machine update logic unit 1106 is configured to receive the prediction information 538 and 540 corresponding to the first and second indices 534 and 536 and to update the PHTs 502 and 504 based on the actual outcome 528 of the conditional branch instruction and the information indicating which table was used for prediction 532.

In some cases only the PHT that was used for prediction 532 is updated. For example, only the PHT that was used for predicted 532 may be updated when the prediction was correct. By only updating the PHT that was used for prediction the prediction that gave the correct result is reinforced. Otherwise the path that led to the correct prediction may be altered. In other cases both PHTs may be updated. For example, both PHTs may be updated when the prediction was incorrect. In particular, if the prediction was incorrect or mis-predicted and there was a high confidence in the prediction it is advantageous to update both PHTs since there has been a change in the behavior of the branch which should be recorded in both PHTs.

Updating a PHT 502 or 504 may comprise generating new prediction information for the PHT 502 or 504 from the received prediction information 538 or 540 and updating the entry of the PHT 502 or 504 indicated by the index 534 or 536 with the new prediction information.

Where the prediction information 538 and 540 comprises a saturating counter, updating the prediction information may comprise incrementing the saturating counter if the conditional branch instruction was taken and decrementing the saturating counter if the conditional branch instruction was not taken.

Figure 12:
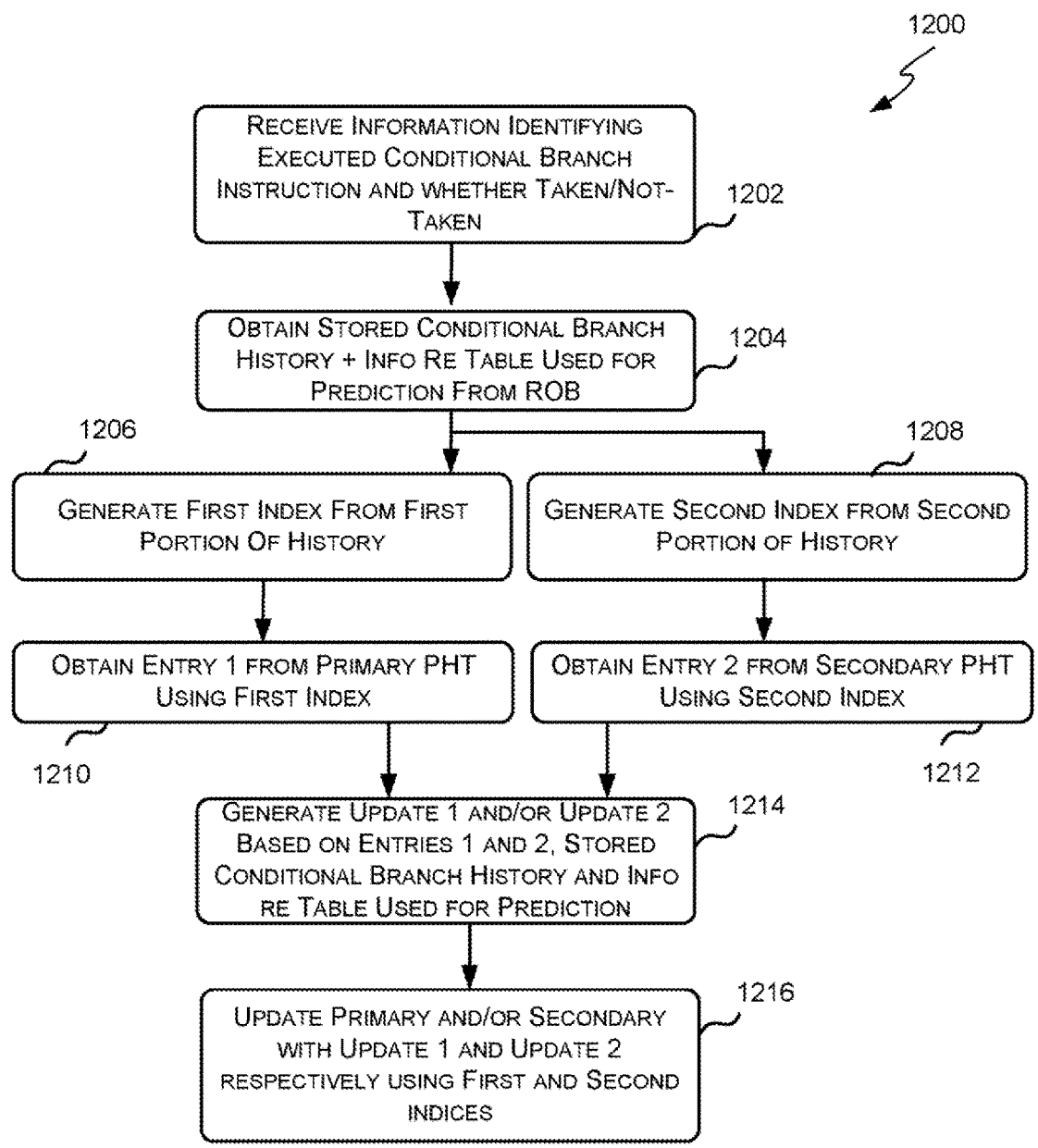
FIG. 12 is a flowchart of an example method for updating the pattern history tables of FIG. 5.

Reference is now made to FIG. 12 which illustrates a method 1200 for updating one or more of the PHTs after a conditional branch instruction has been executed and the actual outcome is known. The method 1200 may be executed by the conditional branch predictor logic unit 414 of FIGS. 4 and 5.

At block 1202 the conditional branch predictor logic unit 414 receives information from the pipelines 408 identifying an executed conditional branch instruction and information indicating whether the branch was taken or not taken. The information identifying the executed conditional branch instruction may be the address (e.g. program counter) of the conditional branch instruction. The information indicating whether the branch was taken may be a single bit where a one ("1") indicates the branch was taken and a zero ("0") indicates the branch was not taken. Once the information identifying the conditional branch instruction and the information indicating whether the branch was taken or not taken has been received, the method 1200 proceeds to block 1204.

At block 1204, the conditional branch predictor logic unit 414 obtains the stored conditional branch history, information indicating which PHT was used for prediction, and the prediction from the ROB. In some cases this information is obtained from the ROB using the program counter of the executed conditional branch instruction. As described above with respect to FIG. 10, after the outcome of a conditional branch instruction has been predicted the conditional branch history at that time is stored to allow the appropriate entry of the PHT(s) to be updated after the conditional branch instruction has been executed. Once the stored information has been obtained from the ROB the method proceeds to blocks 1206 and 1208.

At block 1206, a first index is generated from a predetermined first portion of the stored conditional branch history. In some cases the first index is generated by combining the first portion of the stored conditional branch history with the address (e.g. program counter) of the executed conditional branch instruction or a portion thereof. Similarly, at block 1208 a second index is generated from a predetermined second portion of the stored conditional branch history. The second portion is distinct from the first portion (e.g. the first and second portions comprise a different subset of history information (i.e. history information pertaining to a different subset of previous conditional branch instructions)). In some cases the first and second portions together form the entire stored conditional branch history. In some cases the second index is generated by combining the second portion of the conditional branch history with the address (e.g. program counter) of the conditional branch instruction or a portion thereof. Once the indices have been generated the method 1200 proceeds to blocks 1210 and 1212 respectively.

At blocks 1210 and 1212 the indices generated in blocks 1206 and 1208 are used to obtain prediction information from the first and second PHTs respectively. The prediction information obtained from the first PHT using the first index will be referred to as the first prediction information and the prediction information obtained from the second or secondary PHT using the second index will be referred to as the second prediction information. Once the first and second prediction information has been obtained the method 1200 proceeds to block 1214.

At block 1214, an update is generated for one or both of the PHTs based on the received prediction information, the actual outcome of the conditional branch instruction and the information indicating which table was used for prediction. In some cases update information is only generated for the PHT that was used for the prediction. In other cases update information may be generated for both PHTs. Where the prediction information comprises a saturating counter, generating an update for a PHT may comprise incrementing the saturating counter if the conditional branch instruction was taken and decrementing the saturating counter if the conditional branch instruction was not taken. Once the update or updates has/have been generated the method 1200 proceeds to block 1216.

At block 1216, either or both of the PHTs are updated with the update information generated in block 1214. For example, where update information is generated for a PHT, the PHT is updated by writing the update information to the entry of the PHT pointed to by the index generated in block 1206 or block 1208 Once the PHT(s) has/have been updated, the method 1200 ends.

The methods and conditional branch predictor logic units 414 described herein may be implemented in single-threaded or multi-threaded in-order or out of order processors.

Figure 13:
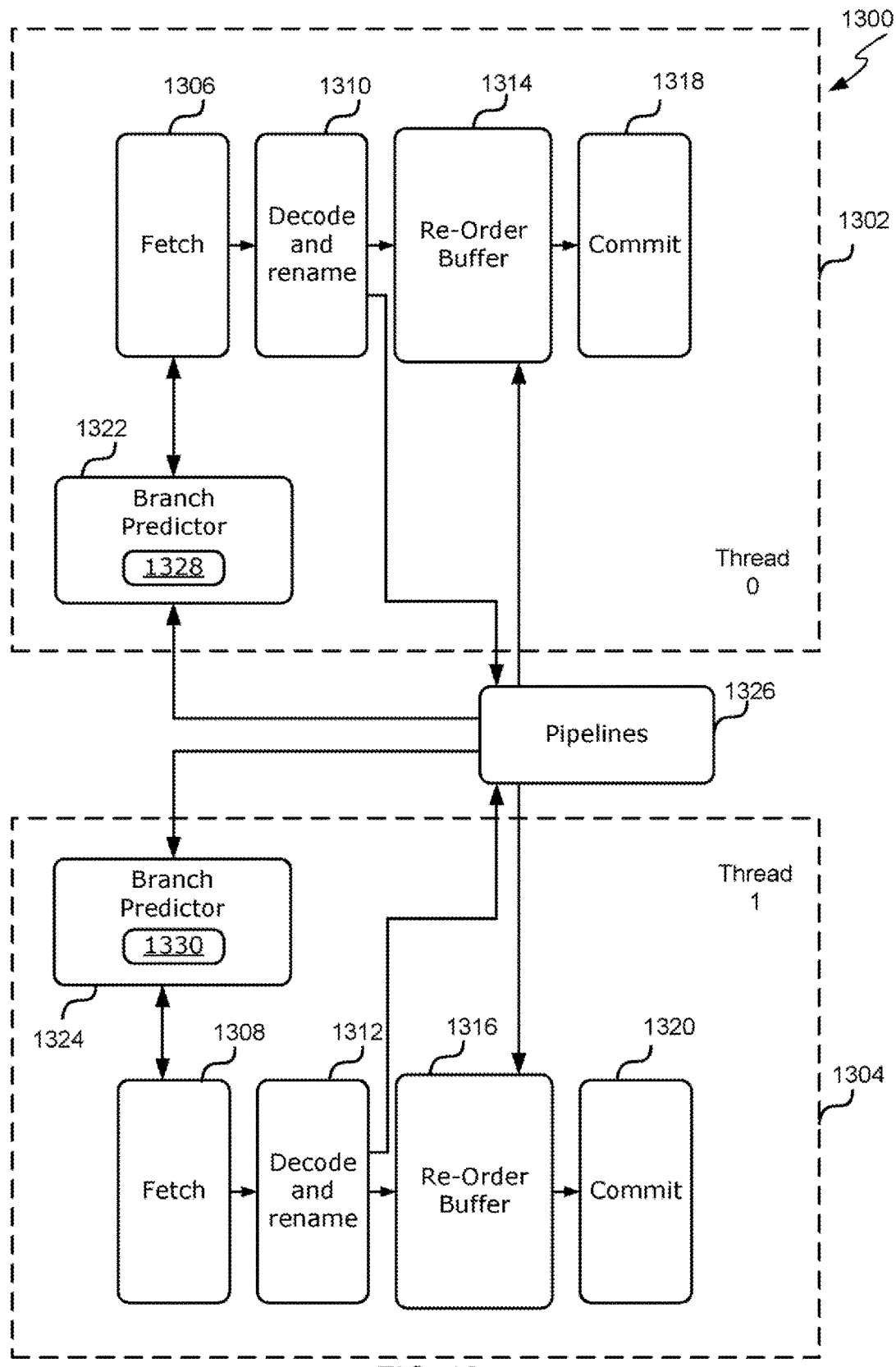
FIG. 13 is a block diagram of an example multi-threaded processor.

Reference is now made to FIG. 13 which illustrates a schematic of a multi-threaded processor 1300. The processor 1300 comprises two threads 1302 and 1304 which will be referred to herein as thread 0 and thread 1 respectively. Each thread 1302 and 1304 comprises a fetch stage 1306 or 1308, a decode and renaming stage 1310 or 1312, a re-order buffer 1314 or 1316, a commit stage 1318 or 1320 and a branch predictor 1322 or 1324 as described above with reference to FIG. 4. The threads 1302 and 1304 share the pipelines 1326. Each branch predictor 1322 or 1324 comprises a conditional branch predictor logic unit 1328 or 1330 that predicts the outcome of a conditional branch instruction as described above with reference to FIGS. 5 to 12.

Although the methods and conditional branch predictor logic units described above use two PHTs, in other examples there may be more than two PHTs. In these cases the conditional branch history would still be divided into two portions and one of the portions would be used to index one table and the other index would be used to index two tables. A third index, for example, may be generated by combining the relevant portion of the conditional branch history with the PC of the conditional branch instruction in a different manner than that was used in generating the first or second index. The prediction information from all PHTs would then be used to make a prediction.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of predicting an outcome of a conditional branch instruction in a program executed by a processor, the method comprising:
   generating, at a first index generation module, a first index from a first portion of a conditional branch history, the conditional branch history comprising history information for a plurality of previously predicted conditional branch instructions, the first portion comprising a first subset of the history information in the conditional branch history;
   identifying an entry in a first pattern history table using the first index, the entry in the first pattern history table comprising first prediction information determined as a function of the first subset of the history information in the conditional branch history, the first prediction information comprising a first prediction and information identifying a strength of the first prediction;
   generating, at a second index generation module, a second index from a second portion of the conditional branch history, the second portion comprising a second subset of the history information in the conditional branch history, the second subset being different from the first subset;
   identifying an entry in a second pattern history table using the second index, the entry in the second pattern history table comprising second prediction information determined as a function of the second subset of the history information in the conditional branch history, the second prediction information comprising a second prediction and information identifying a strength of the second prediction; and predicting, using a decision logic unit, the outcome of the conditional branch instruction by selecting one of the first prediction and the second prediction as the predicted outcome based on the first and second prediction information.

2. A conditional branch predictor logic unit configured to predict an outcome of a conditional branch instruction in a program executed by a processor, the conditional branch predictor logic unit comprising:
a first index generation module configured to generate a first index from a first portion of a conditional branch history, the conditional branch history comprising history information for a plurality of previously predicted conditional branch instructions, the first portion comprising a first subset of the history information in the conditional branch history;
a second index generation module configured to generate a second index from a second portion of the conditional branch history, the second portion comprising a second subset of the history information in the conditional branch history, the second subset being different from the first subset; and
a decision logic unit configured to:
identify an entry in a first pattern history table using the first index, the entry in the first pattern history table comprising first prediction information determined as a function of the first subset of the history information in the conditional branch history, the first prediction information comprising a first prediction and information identifying a strength of the first prediction;
identify an entry in a second pattern history table using the second index, the entry in the second pattern history table comprising second prediction information determined as a function of the second subset of the history information in the conditional branch history, the second prediction information comprising a second prediction and information identifying a strength of the second prediction; and
predict the outcome of the conditional branch instruction by selecting one of the first prediction and the second prediction as the predicted outcome based on the first and second prediction information.

3. The conditional branch predictor logic unit of claim 2, wherein the decision logic unit is further configured to select the first prediction as the predicted outcome when the information identifying the strength of the first prediction indicates the strength of the first prediction is greater than a predetermined threshold.

4. The conditional branch predictor logic unit of claim 2, wherein the decision logic unit is further configured to select the first prediction as the predicted outcome when the information identifying the strength of the first prediction and the information identifying the strength of the second prediction indicate the first prediction is stronger than the second prediction.

5. The conditional branch predictor logic unit of claim 2, wherein the decision logic unit is further configured to store a snapshot of the conditional branch history and an indication of which of the first and second predictions was selected as the predicted outcome in association with information identifying the conditional branch instruction.

6. The conditional branch predictor logic unit of claim 5, wherein the decision logic unit is further configured to store the snapshot of the conditional branch history and the indication of which of the first and second predictions was selected as the predicted outcome in a re-order buffer.

7. The conditional branch predictor logic unit of claim 5, further comprising an update logic unit configured to:
receive information identifying an executed conditional branch instruction and information indicating whether the executed conditional branch was taken; and
update at least one of the first pattern history table and the second pattern history table based on the information identifying the executed conditional branch instruction and the information indicating whether the executed conditional branch was taken.

8. The conditional branch predictor logic unit of claim 7, wherein the update logic unit is further configured to: in response to receiving the information identifying the executed conditional branch instruction, obtain the snapshot of the conditional branch history and the indication of which of the first and second predictions was selected as the predicted outcome associated with the executed conditional branch instruction.

9. The conditional branch predictor logic unit of claim 8, wherein the update logic unit is further configured to update at least one of the first pattern history table and the second pattern history table by:
generating a third index from a first portion of the snapshot of the conditional branch history;
identifying an entry in the first pattern history table using the third index, the entry in the first pattern history table comprising third prediction information;
updating the third prediction information of the entry in the first pattern history table based on the information indicating whether the executed conditional branch was taken;
generating a fourth index from a second portion of the snapshot of the conditional branch history;
identifying an entry in the second pattern history table using the fourth index, the entry in the second pattern history table comprising fourth prediction information; and
updating the fourth prediction information of the entry in the second pattern history table based on the information indicating whether the executed conditional branch was taken.

10. The conditional branch predictor logic unit of claim 9, wherein the update logic unit is further configured to analyze the indication of which of the first and second predictions was selected as the predicted outcome to determine which of the first and second predictions was selected as the predicted outcome; in response to determining that the first prediction was selected as the predicted outcome, only update the first pattern history table; and in response to determining that the second prediction was selected as the predicted outcome, only update the second pattern history table.

11. The conditional branch predictor logic unit of claim 9, wherein each of the third prediction information and the fourth prediction information comprises a saturating counter and the update logic unit is further configured to update prediction information in a pattern history table by incrementing the saturating counter if the information indicating whether the executed conditional branch was taken indicates the branch was taken, and decrementing the saturating counter if the information indicating whether the executed conditional branch was taken indicates the branch was not taken.

12. The conditional branch predictor logic unit of claim 2, wherein the first subset of history information comprises more information than the second subset of history information.

13. The conditional branch predictor logic unit of claim 2, wherein each of the first subset of history information and the second subset of history information comprises a contiguous set of information.

14. The conditional branch predictor logic unit of claim 2, wherein the first index generation module is configured to generate the first index by combining the first portion of the conditional branch history and an address of the conditional branch instruction.

15. The conditional branch predictor logic unit of claim 14, wherein the first index generation module is configured to combine the first portion of the conditional branch history and the address of the conditional branch instruction by performing a hashing function on the first portion of the conditional branch history and at least a portion of the address of the conditional branch instruction.

16. The conditional branch predictor logic unit of claim 2, wherein the second index generation module is configured to generate the second index by combining the second portion of the conditional branch history and an address of the conditional branch instruction.

17. The conditional branch predictor logic unit of claim 16, wherein the second index generation module is configured to combine the second portion of the conditional branch history and the address of the conditional branch instruction by performing a hashing function on the second portion of the conditional branch history and at least a portion of the address of the conditional branch instruction.

18. A processor including a conditional branch predictor logic unit configured to predict an outcome of a conditional branch instruction in a program executed by the processor, the conditional branch predictor logic unit comprising:

a first index generation module configured to generate a first index from a first portion of a conditional branch history, the conditional branch history comprising history information for a plurality of previously predicted conditional branch instructions, the first portion comprising a first subset of the history information in the conditional branch history;

a second index generation module configured to generate a second index from a second portion of the conditional branch history, the second portion comprising a second subset of the history information in the conditional branch history, the second subset being different from the first subset; and a decision logic unit configured to:

identify an entry in a first pattern history table using the first index, the entry in the first pattern history table comprising first prediction information determined as a function of the first subset of the history information in the conditional branch history, the first prediction information comprising a first prediction and information identifying a strength of the first prediction;

identify an entry in a second pattern history table using the second index, the entry in the second pattern history table comprising second prediction information determined as a function of the second subset of the history information in the conditional branch history, the second prediction information comprising a second prediction and information identifying a strength of the second prediction; and predict the outcome of the conditional branch instruction by selecting one of the first prediction and the second prediction as the predicted outcome based on the first and second prediction information.

\* \* \* \* \*